United States Patent [19]

Hsu

[11] 4,424,372
[45] Jan. 3, 1984

[54] 4-SUBSTITUTED PHENYL 4'-(5-N-ALKYL-1,3-DIOXAN-2-YL) THIOBENZOATES

[75] Inventor: Ying-Yen Hsu, Los Altos, Calif.

[73] Assignee: Timex Corporation, Waterbury, Conn.

[21] Appl. No.: 419,655

[22] Filed: Sep. 20, 1982

[51] Int. Cl.³ .................. C09K 3/34; C07D 319/04; G02F 1/13
[52] U.S. Cl. .................. 549/374; 252/299.6; 252/244.61; 350/350 R; 549/373
[58] Field of Search .......... 252/299.6, 299.61, 299.65, 252/299.67; 350/350 R; 549/373, 374, 375

[56] References Cited

U.S. PATENT DOCUMENTS

| | | | |
|---|---|---|---|
| 4,012,773 | 3/1977 | Hidino | 252/299.63 |
| 4,137,250 | 1/1979 | Reynolds | 252/299.67 |
| 4,162,988 | 7/1979 | Maze et al. | 252/299.6 |
| 4,202,791 | 5/1980 | Sato et al. | 252/299.67 |
| 4,207,252 | 6/1980 | Sato et al. | 252/299.6 |
| 4,313,878 | 2/1982 | Hsu | 252/299.61 |
| 4,344,856 | 8/1982 | Demus et al. | 252/299.61 |
| 4,348,324 | 9/1982 | Demus et al. | 252/299.61 |
| 4,356,104 | 10/1982 | Hsu | 252/299.61 |

FOREIGN PATENT DOCUMENTS 2603293  8/1977  Fed. Rep. of Germany .......... 252/299.67

56-108761  8/1981  Japan .......... 252/299.67

OTHER PUBLICATIONS

Neubert, M. E. et al., Mol. Cryst. Liq. Cryst., vol. 76, pp. 43-77, (1981).
Reynolds, R. M. et al., Mol. Cryst. Liq. Cryst., vol. 36, p. 41, (1976).

Primary Examiner—Teddy S. Gron
Attorney, Agent, or Firm—William C. Crutcher; Joseph A. Biela

[57] ABSTRACT

Disclosed are compounds of the formula:

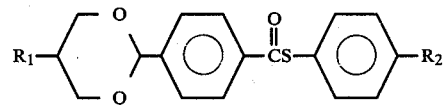

wherein $R_1$ is an alkyl group having 1 to 10 carbon atoms and $R_2$ is either an alkyl or alkoxy group having 1 to 10 carbon atoms or a cyano group or a nitro group. The compounds of the invention are suitable as liquid crystal materials in electrooptic displays. Specifically, these compounds provide a wide mesomorphic range and a high clearing point when added to nematic liquid crystal mixtures used in multiplexed electrooptical displays.

6 Claims, No Drawings

4-SUBSTITUTED PHENYL 4'-(5-N-ALKYL-1,3-DIOXAN-2-YL) THIOBENZOATES

BACKGROUND OF THE INVENTION

The present invention relates to liquid crystal compounds and mixtures thereof which are suitable for use in electrooptical displays, especially of the multiplexed type.

Some of the important characteristics that are required of nematic liquid crystalline compounds used in liquid crystal displays include the following:

(1) The nematic liquid crystal temperature range (mesomorphic range) should be broad, and (2) The clearing point (the N-I point at which the nematic liquid crystal becomes isotropic) should be high.

Generally, prior art compounds attempt to satisfy such requirements, as described in U.S. Pat. No. 4,313,878 issued to Hsu and assigned to the Timex Corporation and in U.S. Pat. No. 4,207,252 issued to Sato et al. and assigned to Dainippon Ink & Chemicals, Inc. and Federal Republic of Germany Pat. No. 2,603,293, only to be surpassed by compounds such as those disclosed and claimed in the present invention.

The melting and clearing points (transition temperatures) of the benzoates of U.S. Pat. No. 4,313,878, and the two-ring thioesters of U.S. Pat. No. 4,207,252 and Federal Republic of Germany Pat. No. 2,603,293 are provided below in Tables 1 through 3, respectively.

TABLE 1

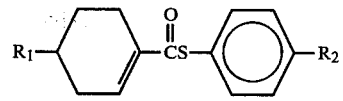

4-n—Alkylphenyl 4'-(5-n—alkyl-1,3-dioxan-2-yl) benzoates
U.S. Pat. No. 4,313,878

| No. of Carbons in $R_1$, $R_2$ | Transition Temperature °C. CN (CS) | NI |
|---|---|---|
| 3, 4 | 68.0 | 173.0 |
| 4, 4 | 75.5 | 162.4 |
| 5, 4 | (69.5) | 159.8 |
| 3, 5 | 65.2 | 174.8 |
| 4, 5 | 63.5 | 168.3 |
| 5, 5 | (68.7) | 165.6 |
| 3, 7 | 61.8 | 161.3 |
| 4, 7 | 63.8 | 155.6 |
| 5, 7 | (55.3) | 158.8 |
| 4, CN | 147.4 | 217.0 |
| 5, CN | 138.3 | 231.0 |
| 5, 4 | 85.6 | 192.0 |

TABLE 2

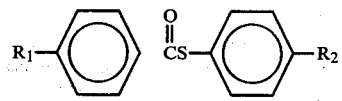

4,4'-Substituted cyclohexene-1-carboxylic and phenylthiol ester (IV)
U.S. Pat. No. 4,207,252

| No. of Carbons in $R_1$, $R_2$ | Transition Temperature °C. CN(CI) | NI(IN) |
|---|---|---|
| 4, 1 | 2.0 | 20.0 |

TABLE 2-continued 4,4'-Substituted cyclohexene-1-carboxylic and phenylthiol ester (IV)
U.S. Pat. No. 4,207,252

| No. of Carbons in $R_1$, $R_2$ | Transition Temperature °C. CN(CI) | NI(IN) |
|---|---|---|
| 3, 4 | (31.5) | (20.5) |
| 3, 5 | 33.0 | 34.0 |
| 4, 5 | 12.0 | 27.0 |
| 4, CN | 69.0 | 82.5 |

TABLE 3

4-Substituted phenyl 4'-n—alkylthiobenzoate
Federal Republic of Germany 2,603,293

| No. of Carbons in $R_1$, $R_2$ | Transition Temperature °C. CN(CI) | NI(IN) |
|---|---|---|
| 4, 1 | (48.5) | (27.5) |
| 4, 5 | 28.0 | 39.5 |
| 7, 5 | 28.0 | 55.0 |
| 5, 4 | 60.0 | 79.0 |
| 4, CN | 83.0 | 90.0 |

The transition temperatures, especially in Tables 2 and 3, are low.

It is, therefore, an object of this invention to provide a new class of liquid crystal compounds exhibiting a wide nematic liquid crystal temperature range and a high clearing point.

It is another object of the invention to provide a new family of compounds that improve liquid crystal properties to provide for optimum display operation.

SUMMARY OF THE INVENTION

In accordance with the present invention, there is provided a new class of compounds useful in liquid crystal mixtures having, generally, a sulfur atom as part of the ester linkage in the thiobenzoate molecule. The liquid crystals containing these compounds are particularly used for multiplexed or low voltage electrooptical displays. The new class of compounds is illustrated by the following structural formula:

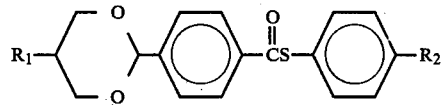

where $R_1$ is an alkyl group having 1 to 10 carbon atoms and $R_2$ is selected from the group consisting of an alkyl and alkoxy group having 1 to 10 carbon atoms, a cyano group, and a nitro group. The compounds are characterized by their effect on liquid crystals in that they exhibit a wide mesomorphic (nematic) temperature range and a high clearing point.

The compounds of the invention are prepared by at least the following methods:

METHOD I

STEP 1    $R_2$—⟨phenyl⟩    n-alkylbenzene

↓ $H_2SO_4$/KOH    conc. sulfuric acid/sat. potassiumhydroxide solution

STEP 2    $R_2$—⟨phenyl⟩—$SO_3K$    potassium 4-n-alkylbenzenesulfonate

↓ $POCl_3$    phosphoryl chloride

STEP 3    $R_2$—⟨phenyl⟩—$SO_2Cl$    4-n-alkylbenzenesulfonyl chloride

↓ Zn/$H_2SO_4$    zinc dust/conc. sulfuric acid

STEP 4    $R_2$—⟨phenyl⟩—SH    4-n-alkylbenzenethiol

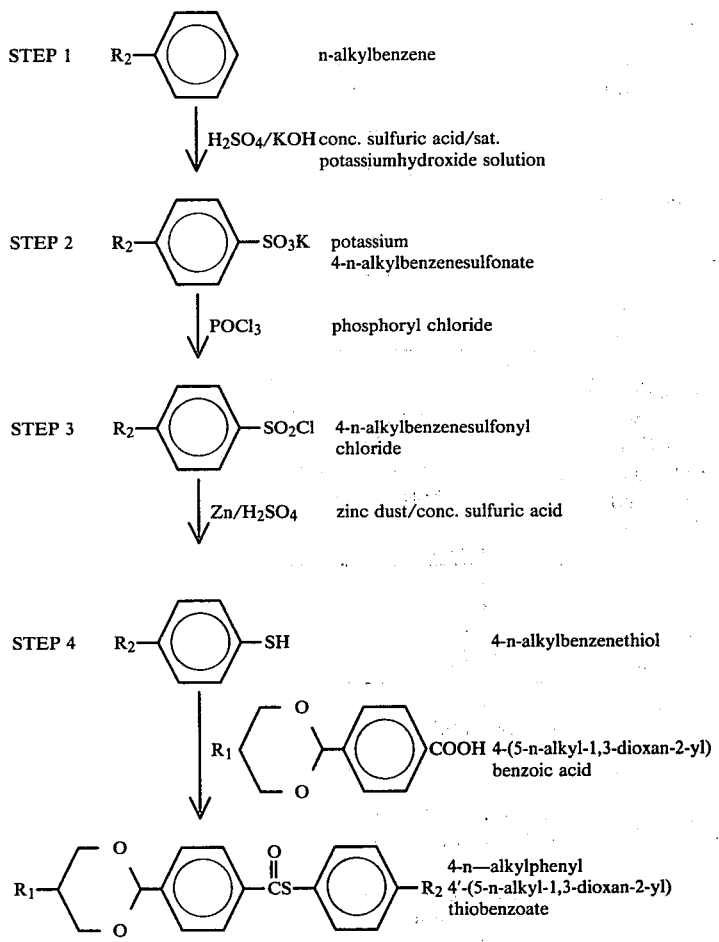

4-(5-n-alkyl-1,3-dioxan-2-yl) benzoic acid 4-n-alkylphenyl 4'-(5-n-alkyl-1,3-dioxan-2-yl) thiobenzoate

METHOD II

STEP 1    $H_2N$—⟨phenyl⟩—CN    4-cyanoaniline

↓ HCl/$NaNO_2$    hydrochloric acid/sodium nitrite
↓ $H_5C_2OCSK$ (S)    potassium ethyl xanthate STEP 2    $H_5C_2OCS$(S)—⟨phenyl⟩—CN    ethyl 4-cyanophenyl xanthate ↓ KOH/EtOH    potassium hydroxide/ethanol STEP 3    HS—⟨phenyl⟩—CN    4-cyanobenzenethiol

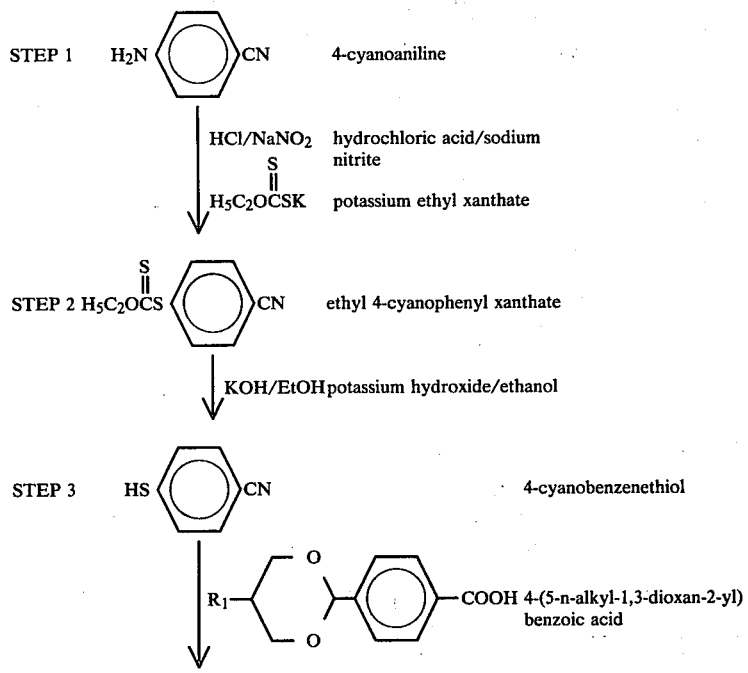

4-(5-n-alkyl-1,3-dioxan-2-yl) benzoic acid

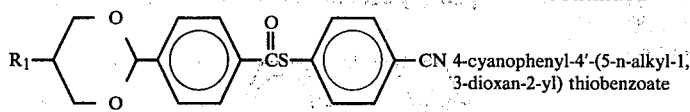 4-cyanophenyl-4'-(5-n-alkyl-1,3-dioxan-2-yl) thiobenzoate

The nature of the invention may be better understood by the following representative embodiments which are included to illustrate the nature of the invention without limiting its scope which is defined in the claims.

DESCRIPTION OF THE PREFERRED EMBODIMENTS

EXAMPLE 1

4-n-pentylphenyl 4'-(5-ethyl-1,3-dioxan-2-yl) thiobenzoate

Step 1

In accordance with Method I, n-pentylbenzene (100 g, 0.675 m) was added to stirred concentrated sulfuric acid (185 ml) at approximately 74° C. Thereafter, the reaction mixture was stirred vigorously for one hour while maintaining the temperature at approximately 74° C. The reaction mixture was cooled and poured into cold water (300 ml) and then extracted with chloroform (2×700 ml). The extract was washed with water (2×1000 ml). The resulting combined aqueous layer was made basic with an alkaline saturated potassium hydroxide solution and was reduced to about 600 ml by distillation. The solution was cooled to about 5° C. and the solid was isolated and dried to yield potassium 4-n-pentylbenzenesulfonate (130 g, 72%).

Step 2

A mixture of potassium 4-n-pentylbenzene sulfonate (65 g, 0.243 m) and phosphoryl chloride (75 g, 0.492 m) was heated to approximately 170° C. with stirring until the reaction mixture became less viscous. Heating continued for approximately one hour. The hot reaction mixture was poured into cold water (1600 ml) and the reaction product was extracted with chloroform (2×600 ml). The extract was washed with water until it was neutralized and dried over anhydrous sodium sulfate. The solvent (chloroform) was evaporated and the extract was vacuum-distilled to give 4-n-pentylbenzenesulfonyl chloride (52 g, 87%, boiling point 132°-134° C./0.3 mm).

Step 3

Zinc dust (39 g) was added to a mixture of 4-n-pentylbenzenesulfonyl chloride (27 g, 0.11 ml) in concentrated sulfuric acid (43 ml) and water (270 ml) at less than 0° C. Thereafter, stirring was continued at a temperature less than 0° C. for about one hour followed by refluxing for approximately three hours. The reaction mixture was cooled and then poured into ice water (350 ml) and the reaction product was extracted with ether (2×400 ml). The extract was washed with water and dried over anhydrous sodium sulfate. The solvent (ether) was evaporated and the reaction product was vacuum-distilled to yield 4-n-pentylbenzenethiol (14 g, 71%, boiling point 90°-94° C./0.6 mm).

Step 4

Dicyclohexylcarbodiimide (2.1 g, 0.01 m) was added to a stirred solution of 4-(5-ethyl-1,3-dioxan-2-yl) benzoic acid (2.36 g, 0.01 m) and 4-n-pentylbenzenethiol (1.8 g, 0.01 m) in methylene chloride (60 ml) at approximately 0° C. The stirring continued at approximately at 0° C. for about one hour and at approximately 20° C. for about four hours. The reaction mixture was filtered and the filtrate was washed with 0.5 N hydrochloric acid, saturated sodium bicarbonate solution, and water, and then dried over anhydrous sodium sulfate. The solvent was evaporated and the reaction product was crystallized from ethanol to yield 4-n-pentylphenyl 4'-(5-ethyl-1,3-dioxan-2-yl) thiobenzoate (3.4 g, 85%); CN 80.5° C.; NI 169.9° C.

EXAMPLE 2

4-Cyanophenyl 4'-(5-n-butyl-1,3-dioxan-2-yl)thiobenzoate

Step 1

In accordance with Method II, a mixture of 4-cyanoaniline (59 g, 0.5 m) in concentrated hydrochloric acid (110 ml) and water (100 ml) was heated with stirring at between 49° and 61° C. for about 30 minutes. The suspension was cooled to approximately 0° C. and a cold solution of sodium nitrite (35.6 g, 0.5 m) in water (100 ml) was added dropwise with stirring at a temperature less than 5° C. Thereafter, the reaction mixture was stirred at a temperature less than 5° C. for approximately one hour. Then the diazonium reaction mixture was added dropwise to a stirred solution of potassium ethyl xanthate (94 g, 0.59 m) in water (200 ml) at a temperature between 39° and 46° C. Thereafter, stirring continued at the same temperature for approximately one hour. The cold reaction mixture was extracted with ether (2×200 ml) and the ethyl cyanophenyl xanthate extract was washed with a 10% sodium hydroxide solution and then with water until neutralized. The extract was dried over anhydrous sodium sulfate and the ether solvent was evaporated.

Step 2

The ethyl 4-cyanophenyl xanthate was dissolved in ethanol (500 ml) and the solution was refluxed. Potassium hydroxide (112 g, 2 m) was added slowly to the resulting hot solution. Thereafter, the reaction mixture solution was refluxed for approximately three hours. The ethanol was distilled off from the reaction mixture and water (100 ml) was added. The reaction mixture was acidified with 6 N sulfuric acid and the reaction product was extracted with ether. The extract was washed with water and dried over anhydrous sodium sulfate. The solvent was evaporated and the reaction product was vacuum-distilled to yield 4-cyanobenzenethiol (20 g, 30%), bp 102°-103° C./2 mm.

Step 3

Dicyclohexylcarbodiimide (2.1 g, 0.01 m) was added to a stirred solution of 4-(5-n-butyl-1,3-dioxan-2-yl) benzoic acid (2.64 g, 0.01 m) and 4-cyanobenzenethiol (1.35 g, 0.01 m) in methylene chloride (60 ml) at approximately 0° C. The stirring continued at about 0° C. for approximately one hour and at about 20° C. for approximately four hours to provide for esterification. The reaction mixture was filtered and the filtrate was washed with 0.5 N hydrochloric acid, saturated sodium bicarbonate solution, and water, and then dried over anhydrous sodium sulfate. The solvent was evaporated and the reaction product was crystallized from ethanol to yield 4-cyanophenyl 4'-(5-n-butyl-1,3-dioxan-2-yl) thiobenzoate (1.76 g, 46%); CN 127.1° C.; NI 239.1° C.

Additional examples of compounds of the invention, along with their transition temperatures are given in TABLE I below:

TABLE I

Phase Transition Temperature for 4-Substituted Phenyl 4'-(5-n—alkyl-1,3-dioxan-2-yl) thiobenzoates

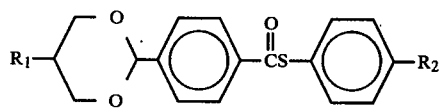

| Compound | $R_1$ | $R_2$ | TRANSITION TEMPERATURE °C. | |
|---|---|---|---|---|
| | | | CN | NI |
| 1 | $C_3H_7$ | $CH_3$ | 120.0 | 221.6 |
| 2 | $C_5H_{11}$ | $CH_3$ | 103.5 | 206.2 |
| 3 | $C_3H_7$ | $C_4H_9$ | 77.1 | 207.7 |
| 4 | $C_4H_9$ | $C_4H_9$ | 78.9 | 197.3 |
| 5 | $C_5H_{11}$ | $C_4H_9$ | 79.1 | 196.3 |
| 6 | $C_2H_5$ | $C_5H_{11}$ | 80.5 | 169.9 |
| 7 | $C_3H_7$ | $C_5H_{11}$ | 90.3 | 191.2 |
| 8 | $C_4H_9$ | $C_5H_{11}$ | 78.8 | 184.4 |
| 9 | $C_5H_{11}$ | $C_5H_{11}$ | 87.8 | 186.4 |
| 10 | $C_3H_7$ | $C_7H_{15}$ | 81.1 | 190.8 |
| 11 | $C_4H_9$ | $C_7H_{15}$ | 77.7 | 184.6 |
| 12 | $C_5H_{11}$ | $C_7H_{15}$ | 87.4 | 186.3 |
| 13 | $C_3H_7$ | $OC_4H_9$ | 83.8 | 212.8 |
| 14 | $C_4H_9$ | $OC_4H_9$ | 86.9 | 202.4 |
| 15 | $C_5H_{11}$ | $OC_4H_9$ | 83.9 | 207.8 |
| 16 | $C_4H_9$ | CN | 127.1 | 239.1 |
| 17 | $C_5H_{11}$ | CN | 111.1 | 202.1 |
| 18 | $C_3H_{17}$ | $NO_2$ | 140.0 | 172.0 |

The compounds of the present invention exhibit a wide mesomorphic (nematic) temperature range and high clearing points over the known prior art.

What is claimed is:

1. A compound of the formula:

wherein $R_1$ is an alkyl group having 1 to 10 carbon atoms and $R_2$ is selected from the group consisting of an alkyl and alkoxy group having 1 to 10 carbon atoms, a cyano group and a nitro group.

2. A liquid crystal compound of the formula:

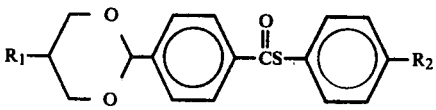

wherein $R_1$ is an alkyl group having 1 to 5 carbon atoms and $R_2$ is selected from the group consisting of an alkyl and alkoxy group having 1 to 5 carbon atoms, a cyano group, and a nitro group.

3. A liquid crystal compound having the formula:

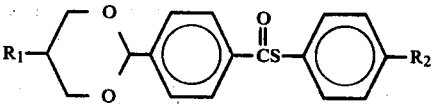

wherein $R_1$ and $R_2$ are the same or different alkyl groups having 1 to 5 carbon atoms.

4. A liquid crystal compound having the formula:

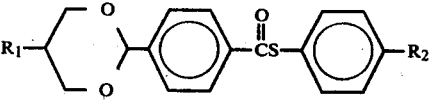

wherein $R_1$ is an alkyl group having 1 to 5 carbon atoms and $R_2$ is a cyano group.

5. A liquid crystal compound having the formula:

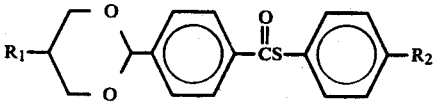

wherein $R_1$ is an alkyl group having 1 to 5 carbon atoms and $R_2$ is a nitro group.

6. A liquid crystal compound having the formula:

wherein $R_1$ is an alkyl group having 3 to 5 carbon atoms and $R_2$ is an alkoxy group having four carbon atoms.

* * * * *